United States Patent [19]

Sommen

[11] Patent Number: 5,030,840
[45] Date of Patent: Jul. 9, 1991

[54] ANALOG LASER RECEIVER FOR DETERMINING THE POSITION OF INCIDENCE OF A BEAM OF LASER LIGHT THEREON

[76] Inventor: Cornelis B. M. Sommen, Triangeldreef 53, 4876 EG Etten-Leur, Netherlands

[21] Appl. No.: 479,672

[22] Filed: Feb. 15, 1990

[51] Int. Cl.$^5$ .................. G01N 21/86; G01C 3/08
[52] U.S. Cl. ................... 250/561; 250/208.2; 356/4; 356/400
[58] Field of Search .................. 356/4, 152, 141, 400; 250/561, 208.2, 203.1, 206.1, 208.5; 33/286

[56] References Cited

U.S. PATENT DOCUMENTS

| | | | |
|---|---|---|---|
| 3,649,122 | 3/1972 | Holtz | 356/4 |
| 3,894,230 | 7/1975 | Rorden et al. | 250/208.2 |
| 3,972,622 | 8/1976 | Mason et al. | 356/172 |
| 4,566,788 | 1/1986 | Buczek | 356/4 |
| 4,730,920 | 3/1988 | Schlemmer et al. | 356/4 |
| 4,767,634 | 6/1987 | Petersen | 356/4 |
| 4,907,874 | 3/1990 | Ake | 356/4 |
| 4,912,643 | 3/1990 | Beirxe | 356/4 |
| 4,945,221 | 7/1990 | Nielsen et al. | 250/208.2 |

FOREIGN PATENT DOCUMENTS 0219767  4/1987  European Pat. Off. .
0262764  4/1988  European Pat. Off. .

Primary Examiner—David C. Nelms
Assistant Examiner—Michael Messinger
Attorney, Agent, or Firm—Wegner, Cantor, Mueller & Player

[57] ABSTRACT

An analog laser receiver for determining the position of incidence of a beam of laser light thereon is a device having a number of detectors aligned in a direction and circuitry which generates an output signal representative of which detectors detected the incident laser light. In a preferred embodiment of this device, a series circuit of an amplifier and a pulse generator is connected between each detector and a corresponding junction of a resistor ladder network. A synchronization circuit may also be provided to synchronize the outputs of the pulse generators.

13 Claims, 3 Drawing Sheets

ANALOG LASER RECEIVER FOR DETERMINING THE POSITION OF INCIDENCE OF A BEAM OF LASER LIGHT THEREON

BACKGROUND OF THE INVENTION

The present invention relates to a device for generating a signal that forms a representation of the position of incidence of a beam of radiation onto an elongate detector forming part of the device.

Such detectors are much used in the field of land surveying, and particularly as altimeter. Use is made here of a laser light source which emits a bundle of laser light propagating in hoizontal direction. In general this laser light source is embodied such that the laser light beam emitted thereby rotates in the horizontal plane. To this end the laser light source is generally provided with a rotatably driven prism arranged on top of the laser light source which reflects the laser beam radiated upward from the laser light source into the horizontal plane. Such a configuration is otherwise shown in FIG. 1.

Such detectors are also used in laser measuring systems wherein the laser beams extend at least partially vertically.

At some distance herefrom, whereby distances in the order of magnitude of several tens to several hundreds of meters should be envisioned, a laser receiver is located which delivers an output signal representing the height at which the laser beam emitted by the laser light source strikes the laser receiver. For this purpose such a laser receiver is provided with a detector.

In accordance with a known type of laser receiver, such a detector is formed by a number of detector elements which, when such a detector element is struck by a laser beam, each generate a signal. This signal is generally fed to a digital processing circuit, wherein the processing circuit generates a digital output signal that forms a representation of the height at which the laser beam strikes the laser receiver.

Also known are laser receivers in which is used a laser detector of limited dimensions which is movable in vertical direction along the laser receiver. Such laser receivers are controlled such that the detector "searches" as it were for the laser bundle and follows it when there are changes of height. These laser receivers embodied with mechanically moving parts have the drawback that they are comparatively slow, so that when there are rapid changes in the height of the received laser bundle the output signal cannot follow these rapid changes, and these are therefore less suitable for controlling fast-working apparatus.

It should be borne in mind here that the output signal of such receivers can be used for instance for controlling cutting apparatus for cutting away road surfaces, grinding apparatus for grinding grooves in road surfaces, and for instance for ballast bed packing machines for tamping ballast under railway sleepers so that the railway tracks assume the correct height.

Such laser receivers otherwise have the drawback that they are also sensitive to light originating from the same laser transmitter and which has been reflected by random objects. The thus reflected laser beams can have a disadvantageous effect on the proper operation of the detector, so that the output signal is not an exact indication of the position of incidence of the laser beam. The same is true of the first mentioned type of detector.

SUMMARY OF THE INVENTION

The object of the invention is therefore to provide such a device which provides a rapidly available, analog output signal. This object is achieved in that the detector is provided with a number of fixedly arranged detector elements and with means for exciting a signal, the size of which is a measure for the position of incidence of the beam of radiation.

BRIEF DESCRIPTION OF THE DRAWINGS

The invention will now be elucidated with reference to the annexed drawings, in which.

DETAILED DESCRIPTION

Figure 1:
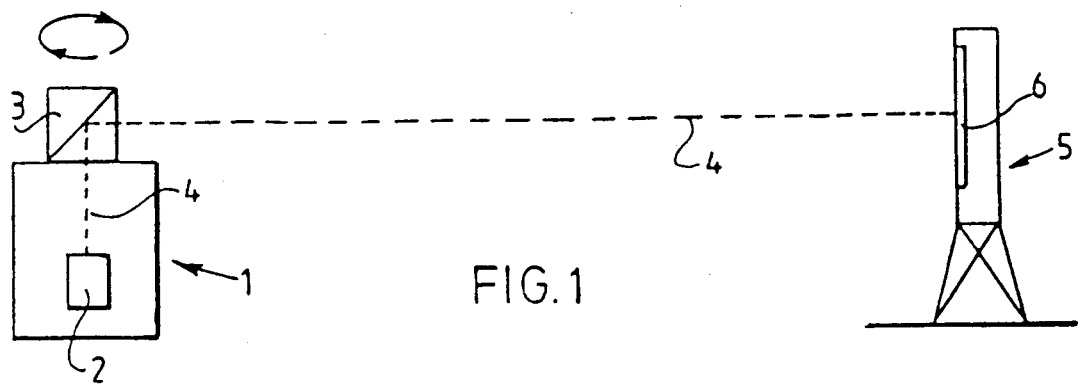
FIG. 1 shows a schematic view of a device for height measurement, wherein the present invention can be employed.

As stated above, a laser transmitter 1 comprises a laser light source 2, which emits a laser light beam 4 to a prism 3 arranged rotatably on top of the laser transmitter 1. The laser beam 4 is reflected through the rotatable prism and emitted in this way in horizontal direction. Through the rotation of the prism 3 the reflected laser light beam 4 will describe a circle. Arranged at some distance from the transmitter 1 is a laser receiver 5. This is provided with a detector 6, the length whereof is at least greater than the anticipated variation range in the height of the laser beam 4.

Figure 2:
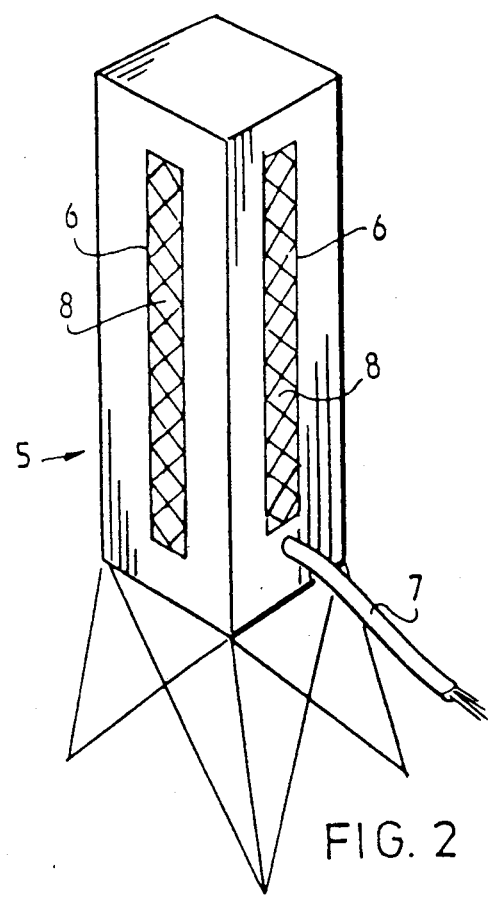
FIG. 2 is a schematic, perspective view of an embodiment of the present invention.

As shown in FIG. 2 the laser receiver 5 is provided with four detectors 6 which are each arranged on a side of the receiver, so that the receiver can receive laser light from any horizontal direction. It is also provided with an output cable 7 on which is provided an output signal. The detector is assembled from a number of detector elements 8, this number being dependent on the length of the detector. The normally square detector elements are placed such that one of the diagonals of the square is vertical. The number of detector elements is dependent on the maximum attenuated variation of the height of the laser beam.

Figure 3:
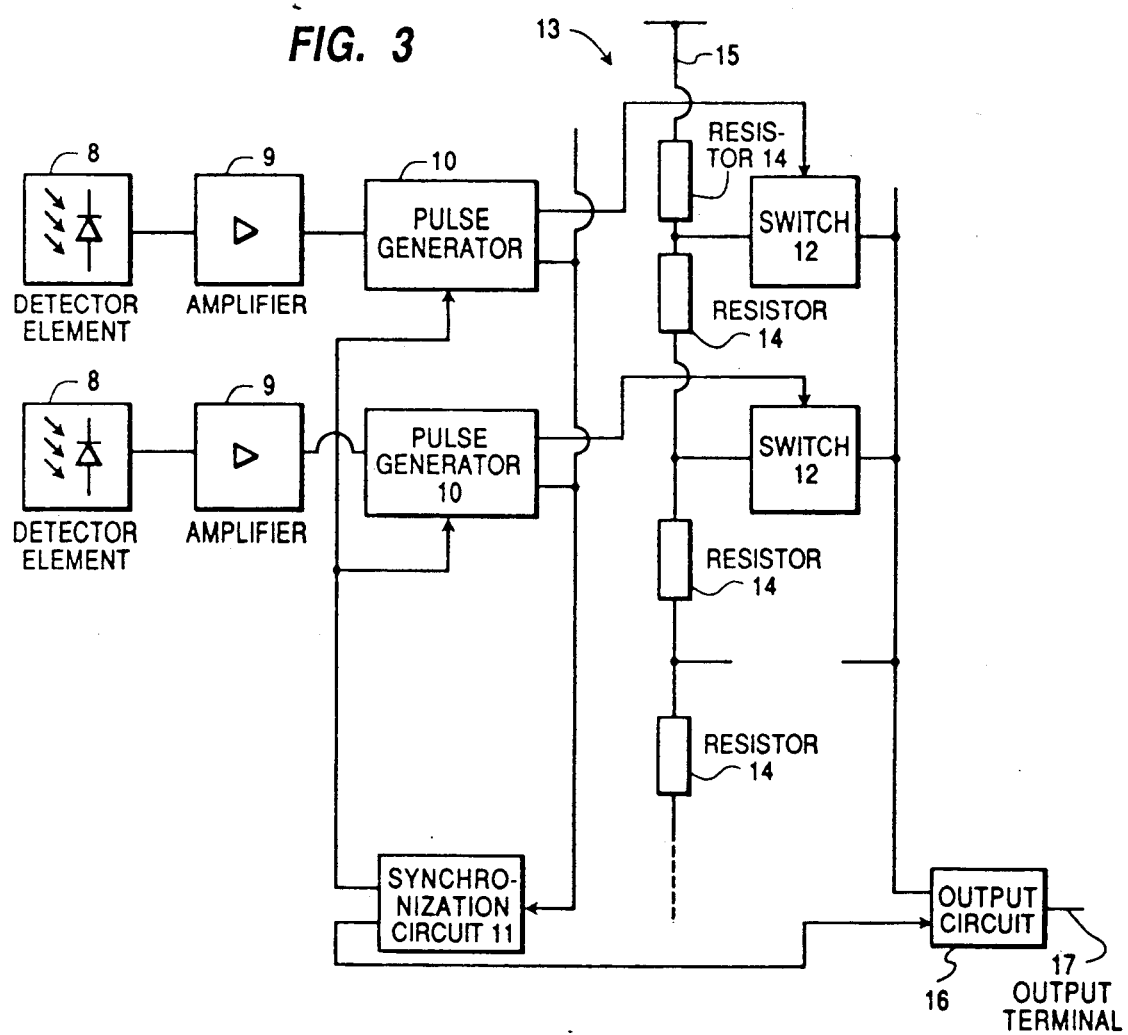
FIG. 3 shows a block diagram of a preferred embodiment of the circuit according to the present invention.

The block diagram in FIG. 3 will now be discussed.

Each of the detector elements is connected to an amplifier 9 which is connected in turn to a pulse generator 10. A signal coming from a synchronisation circuit 11 is further fed to each of the pulse generators.

The output of each of the pulse generators is connected to a respective electronic switch 12. The output of each of the pulse generators is also connected to the normalisation circuit and an output circuit. One side of each of the switches 12 is connected to junction points of a resistor ladder 13 formed by separate resistors 14 which are connected between a supply voltage terminal 15 and earth. The other side of each of the switches 12 is connected to the output circuit 16. Connected to the output circuit 16 is an output terminal 17. The length of the resistor ladder 13, and therefore the number of resistors 14, thus depends on the number of detector elements used. When a laser receiver is provided with more than one detector, as is shown in FIG. 2, the detector elements, which are arranged at the same level, are connected in parallel.

Figure 4:
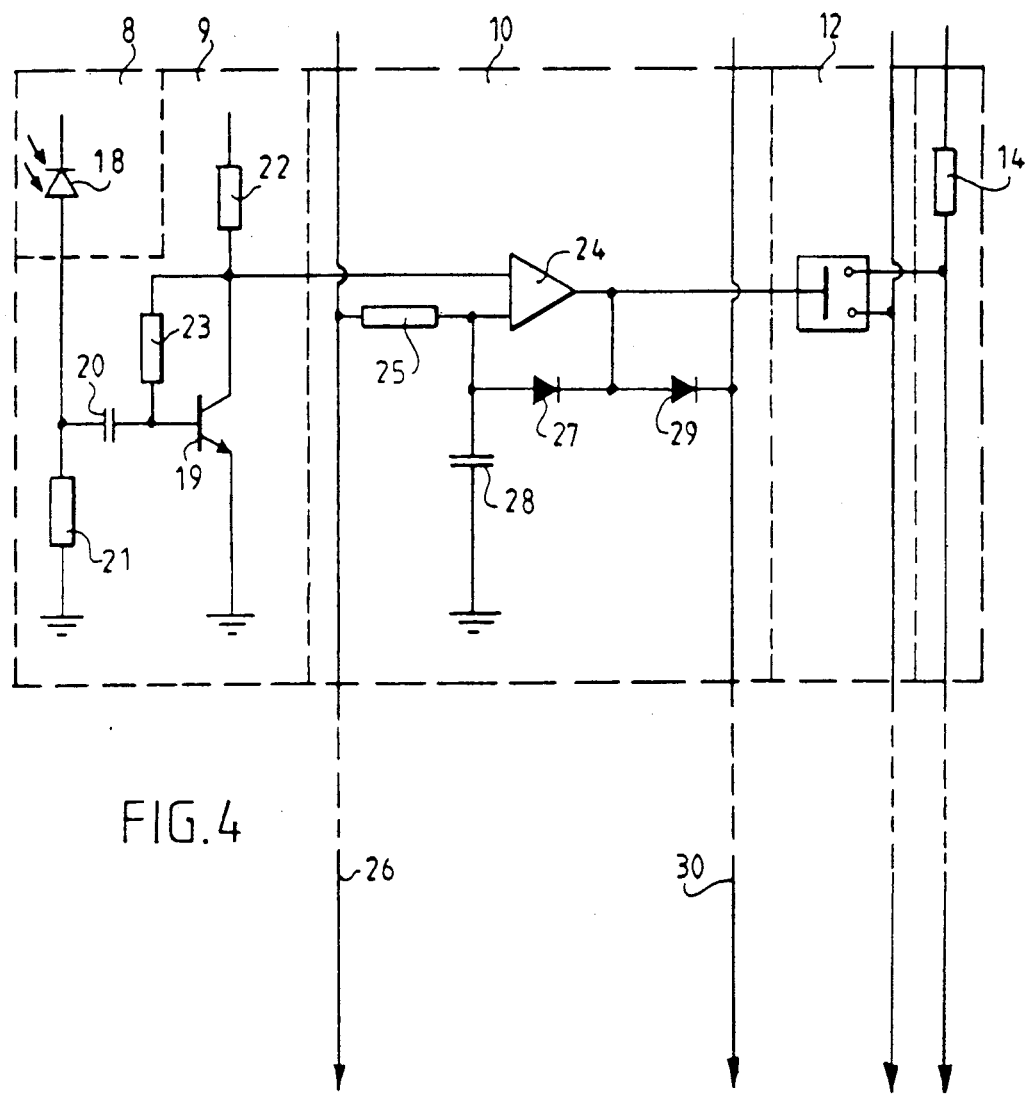
FIG. 4 shows a circuit diagram of a portion of the circuit according to the present invention.

FIG. 4 shows a circuit diagram of an embodiment of the combination of a detector element 8, an amplifier 9, a pulse generator 10 located on the same level, a switch 12 and a resistor 14. Multiple detector elements 8 can be connected in parallel.

Each of the detector elements 8 is formed by a photodiode 18, the cathode of which is connected to the feed voltage and the anode of which is coupled to the input terminal of the amplifier 9. The amplifier 9 comprises a transistor 19, the base of which is connected to the photodiode by means of a capacitor 20 and a resistor 21. The transistor 19 is further provided with an output resistor 22 which is provided with a feedback resistor 23. The output terminal of the amplifier 9 is coupled to the pulse circuit 10.

This pulse circuit 10 is formed by an operational amplifier 24, the positive input terminal of which is coupled to the output terminal of amplifier 9 and the negative input terminal of which is connected to a trigger line 26 by means of a resistor 25. The negative input terminal of the operational amplifier 24 is further fed back by means of a diode 27 and a capacitor 28. The output terminal of the operational amplifier 24 is fed by means of a gate diode to a collector line 30, while the output signal is also fed to a switch 12.

Under the influence of the pulses coming from the pulse generators the synchronisation circuit thus generates a DC-signal, the magnitude of which is such, that the length of the longest pulse generated by any of the pulse generators 10 is normalised.

Figure 5:
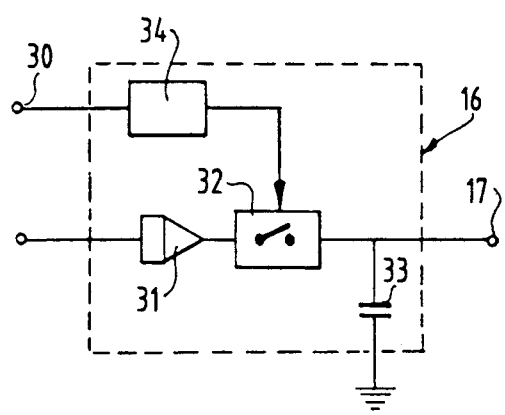
FIG. 5 shows a circuit diagram of another portion of the circuit according to the present invention.

In FIG. 5 a circuit diagram of the output circuit 16 is shown. The output signal from all switches is fed to the input of the output circuit 16.

The output circuit 16 comprises an integrating memory 31, usually implemented as a first capacitor, a switch 32 and a second memory 33. The switch is usually open, and closes only when a pulse is present of line 30, so that only then the magnitude on the first capacitor 31 is fed towards the second capacitor 33.

The operation of the circuit according to the present invention will now be elucidated. The bundle of laser light falling periodically on the detector elements 8 is detected by the detector elements 8 and converted into an electric signal, which is amplified in the amplifier 9 and which is fed to a pulse generator 10. The latter is constructed such that the pulse length of the signal generated by the pulse generator 10 is proportional to the integral of the intensity to time of the laser light falling onto the relevant detector element. The pulse generator generating the longest pulse thus indicates the detector element onto which falls the most laser light, and only the longest pulse is available on line 30, as all other pulses are shorter and fall within the longest pulse.

The output signal of each of the pulse generators 10 is fed to a combination circuit which is formed by a combination of a ladder network 13, wherein the junction point between each of the resistors 14 forming part of the ladder network 13 is connected to a switch 12, of which the other terminal is connected to an output terminal. Under the influence of the output signal of the relevant pulse generator each of the switches 12 is closed for a determined period of time so that the voltage level present on the relevant junction point is transmitted to the output terminal.

The longest pulse from the pulse generator 10 is thus fed to the trigger circuit 11. The normalising circuit generates a signal, which is fed to all pulse generators, and which has such an effect that the longest pulse length is normalised.

The switch, which is related to the detector element onto which falls the laser bundle with the greatest intensity, is closed for the longest period of time so that this detector element and the associated voltage level, which is determined by the ladder network 13, has the greatest effect on the output signal fed to the output circuit. As a result of the integrating action of this circuit this output signal is held and delivered to the output terminal 17.

When the light bundle falls between two detector elements, two adjacent switches will generate pulses of virtually the same length. As a consequence of the intergrating action of the output circuit 16 these voltage levels are averaged. Thus obtained on the output terminal 17 is an output signal, the level of which is an analog representation of the place at which the laser light beam strikes the detector.

The trigger circuit is further embodied such that the voltage level of the trigger signal is controlled such that the length of the longest pulse generated by any of the pulse generators is always constant. The influence of the light intensity of the laser beam on the analog output signal is thus avoided, so that the pulse length is as it were normalized. The intensity of the light falling on the relevant detector element has no further influence thereon, so that the signal fed to the output circuit 16 always remains dependent only on the voltage distribution on the ladder network and therefore on the location at which the laser bundle strikes the detector, and not on the intensity of the bundle.

It is also possible to embody the trigger circuit such that each time a set simultaneously occurring pulses takes place, the time duration of the longest thereof is measured, and when the length thereof does not satisfy a determined minimal value, a signal is fed to the output circuit so that the control circuit suppresses the then occurring pulses. The said minimal value is dependent on the longest pulse occurring during a preceding period. In this way signals occurring as a result of laser reflection can be effectively suppressed.

The output circuit has such an effect that the output signal from the ladder network is only fed to the output of the apparatus if it is within sychronisation, i.e. when the signal is generated during the hit of the laser beam. This avoids the influence of surrounding sunlight. Therefore the signal on line 30 is initially examined in examination subcircuit 14 whether the pulse length and the frequency are correct. This avoids the influence of reflected laser pulses, which would lead to a spurious output signal.

It is finally noted the this device can be embodied with a great length, or rather, height. It is in any case possible to increase arbitrarily the number of detector elements. The ladder network must then of course be adapted.

In addition the invention is elucidated with reference to a single embodiment of the applied circuit. Diverse variations may of course be applied to the circuit diagram.

Through effective use of switch components and digital circuits the number of components is limited. This results in a reduction of the cost price and a reduction of the space required on the print board so that the complete circuit, including the detector elements, can be placed on one print board, which again results in a decrease in cost. The active width of a sub-circuit belonging to a detector element is equal to the active width of a detector element.

What is claimed is:

1. Apparatus for generating a signal representative of a position of incidence of a beam of light onto an elongate detector of the apparatus, comprising:
   a plurality of detector elements fixedly disposed on said elongate detector; and
   means for outputting a dignal representative of the position of incidence of the beam of laser light, said means comprising:
      a resistor ladder network, and
      a plurality of pulse generators, wherein one said pulse generator is connected between each of the detector elements and a corresponding junction of the resistor ladder network, and wherein each said pulse generator generates pulses of a length which is proportional to the integral with respect to time of an output signal of the detector element to which it is connected.

2. An apparatus as claimed in claim 1, wherein each said pulse generator is assigned an order number and is connected to a combination circuit which produces an output signal having an amplitude which is representative of the order number of one of said pulse generators which generates the longest pulse.

3. An apparatus as claimed in claim 2, wherein the amplitude of the output signal of the combination circuit is representative of the order numbers of pulse generators which generate pulses, said pulse generators which generate pulses being weighed according to their relative pulse lengths.

4. An apparatus as claimed in claim 3, wherein each of said pulse generators is further connected to a synchronization circuit.

5. An apparatus as claimed in claim 4, wherein the amplitude of a signal generated by the synchronization circuit normalizes the length of the longest signal generated by any of the pulse generators.

6. An apparatus as claimed in claim 1, further comprising means for measuring a time duration of a longest pulse occurring at a particular moment and for suppressing a set of simultaneously occurring pulses when the longest pulse of said simultaneously occurring pulses does not meet a predetermined value.

7. Apparatus for generating a signal representative of a position of incidence of a beam of light onto an elongate detector of the apparatus, comprising:
   a plurality of detector elements fixedly disposed on said elongate detector; and
   means for outputting a signal representative of the position of incidence of the beam laser light, said means comprising:
      a resistor ladder network, and
      a plurality of amplifiers, wherein one said amplifier is connected between each of the detector elements and a corresponding junction of the resistor ladder network, and wherein each said amplifier amplifies an output signal of the detector element to which it is connected.

8. Apparatus for generating a signal representative of a position of incidence of a beam of light onto an elongate detector of the apparatus, comprising:
   a plurality of detector elements fixedly disposed on said elongate detector; and
   means for outputting a signal representative of the position of incidence of the beam of laser light, said means comprising:
      a resistor ladder network,
      a plurality of amplifiers, wherein one said amplifier is connected between each of the detector elements and a corresponding junction of the resistor ladder network, and wherein each said amplifier amplifies an output signal of the detector element to which it is connected, and
      a plurality of pulse generators, wherein one said pulse generator is connected between each of the plurality of amplifiers and the corresponding junction of the resistor ladder network, and wherein each said pulse generator generates pulses of a length which is proportional to the integral with respect to time of an output signal of the amplifier to which it is connected.

9. An apparatus as claimed in claim 8, wherein each said pulse generator is assigned an order number and is connected to a combination circuit which produces an output signal having an amplitude which is representative of the order number of one of said pulse generators which generates the longest pulses.

10. An apparatus as claimed in claim 9, wherein the amplitude of the output signal of the combination circuit is representative of the order number of pulse generators which generate pulses, said pulse generators which generate pulses being weighed according to their relative pulse lengths.

11. An apparatus as claimed in claim 10, wherein each of said pulse generators is further connected to a synchronization circuit.

12. An apparatus as claimed in claim 11, wherein the amplitude of a signal generated by the synchronization circuit normalizes the length of the longest signal generated by any of the pulse generators.

13. An apparatus as claimed in claim 8, further comprising means for measuring a time duration of a longest pulse occurring at a particular moment and for suppressing a set of simultaneously occurring pulse when the longest pulse of said simultaneously occurring pulses does not meet a predetermined value.

* * * * *